US006843919B2

United States Patent
Klabunde et al.

(10) Patent No.: US 6,843,919 B2
(45) Date of Patent: Jan. 18, 2005

(54) CARBON-COATED METAL OXIDE NANOPARTICLES

(75) Inventors: Kenneth J. Klabunde, Manhattan, KS (US); Aleksandr F. Bedilo, Manhattan, KS (US); Olga B. Koper, Manhattan, KS (US); Michael Sigel, Marion, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 146 days.

(21) Appl. No.: 10/264,710

(22) Filed: Oct. 4, 2002

(65) Prior Publication Data

US 2004/0065619 A1 Apr. 8, 2004

(Under 37 CFR 1.47)

(51) Int. Cl.[7] .................................................. B01D 15/00
(52) U.S. Cl. .......................... 210/660; 210/690; 428/403
(58) Field of Search .................................. 210/681, 688, 210/764, 690, 660; 428/403

(56) References Cited

U.S. PATENT DOCUMENTS 6,057,488 A * 5/2000 Koper et al. ................. 588/200
6,387,531 B1 * 5/2002 Bi et al. ..................... 428/570

* cited by examiner

*Primary Examiner*—Robert A. Hopkins
(74) *Attorney, Agent, or Firm*—Hovey Williams LLP

(57) ABSTRACT

Composites for destroying chemical and biological agents such as toxins and bacteria, and methods of preparing and using those composites are provided. According to the invention, the substance to be destroyed is contacted with the inventive composites which comprise finely divided metal oxide nanoparticles at least partially coated with carbon. Advantageously, the composites exclude water while not excluding the target compound or adsorbates. The desired metal oxide nanoparticles can be pressed into pellets for use when a powder is not feasible. Preferred metal oxide nanoparticles include MgO, SrO, BaO, CaO, $TiO_2$, $ZrO_2$, FeO, $V_2O_3$, $V_2O_5$, $Mn_2O_3$, $Fe_2O_3$, NiO, CuO, $Al_2O_3$, $SiO_2$, ZnO, $Ag_2O$, and mixtures thereof.

37 Claims, 11 Drawing Sheets

20 nm 20 nm

CARBON-COATED METAL OXIDE NANOPARTICLES

BACKGROUND OF THE INVENTION

1. Field of the Invention

Figure 1:
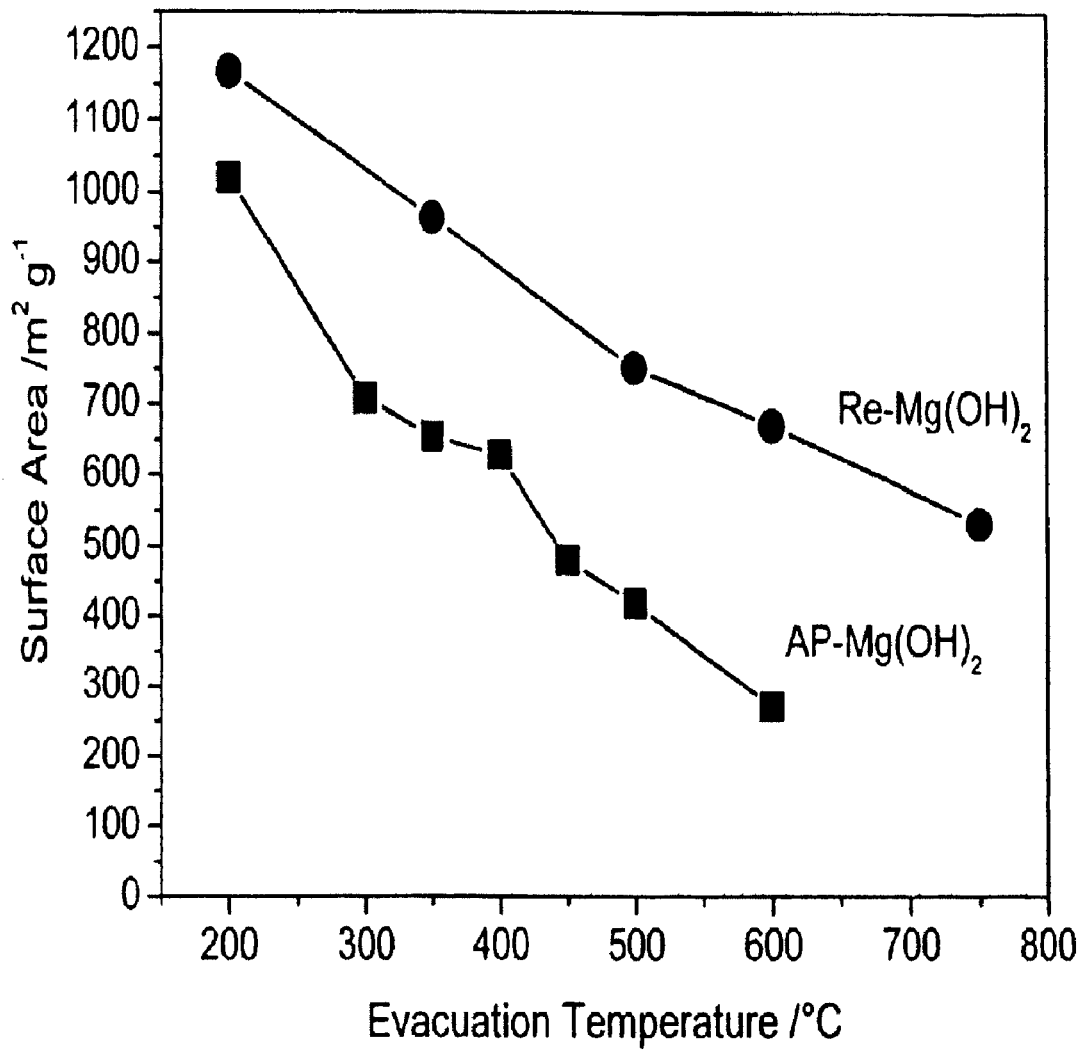

The present invention is broadly concerned with composites and methods of using those composites for sorbing and/or destroying dangerous substances such as chemical and biological warfare agents and environmental pollutants in air, water, hydrocarbon or fuel streams, and soil. The methods of the invention are carried out by simply contacting the target substance with metal oxide nanoparticles coated with carbon.

2. Description of the Prior Art

Nanocrystals of common metal oxides such as MgO, CaO, ZnO, $TiO_2$, $Al_2O_3$, and $Fe_2O_3$, have been shown to be highly efficient and active adsorbents for many toxic chemicals including air pollutants, chemical warfare agents, and acid gases. In most cases, destructive adsorption takes place on the surface of the nanocrystals, so that the adsorbate is chemically dismantled and thereby made nontoxic. In particular, aerogel-prepared (AP) nanocrystalline MgO has been shown to have small average particle sizes (~4 nm), high surface areas (>500 $m^2/g$) and high reactivities. Klabunde et al., *J. Phys. Chem.,* 1996, 100, 12142; S. Utamapanya et al., *Chem. Mater.,* 1991, 3, 175, each incorporated by reference herein.

The use of these nanocrystalline metal oxides is limited under conditions where liquid water or water vapor is present due to the tendency of the oxides to adsorb water, and thereby be partially deactivated toward adsorption of the target pollutants. Although the target pollutants are usually subjected to conversion in the presence of water as well, relatively large amounts of water can mitigate against the adsorption of the target adsorbate, decreasing the efficiency of the destructive adsorbent.

Activated carbon is primarily made of graphitic structures which exhibit a less polar surface. Activated carbon has a lower tendency to adsorb water than nanocrystalline metal oxide surfaces do. Moreover, activated carbon is itself a widely used adsorbent against unwanted fluids or the like.

SUMMARY OF THE INVENTION

The present invention overcomes these problems and provides compositions and methods for destructively sorbing (e.g., adsorption, absorption, and chemisorption) and destroying biological and chemical agents. This is broadly accomplished through the use of finely divided nanoscale metal oxide adsorbents which are at least partially coated with carbon.

In more detail, the nanoscale adsorbents according to the invention are formed from metal oxides. Preferred metal oxides include those selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, CuO, $Al_2O_3$, $SiO_2$, ZnO, $Ag_2O$, the corresponding hydroxides of the foregoing, and mixtures thereof. The adsorbents prior to coating should have an average crystallite size (as is conventional in the art, the term "particle" is used herein interchangeably with the term "crystallite") of from about 2–50 nm, preferably from about 3–10 nm, and more preferably from about 4–8 nm.

In terms of pore size, the preferred coated composites should have an average pore diameter of at least about 10 Å, and more preferably from about 30–100 Å. The final coated composite will have an average overall crystallite size of from about 3–60 nm, preferably from about 3–15 nm, and more preferably from about 5–10 nm. Thus, the coating layer will have a thickness of less than about 1 nm, preferably less than about 10 Å, and more preferably of from about 3–7 Å. The final coated composites will also exhibit a Brunauer-Emmett-Teller (BET) multi-point surface area of from about 30–700 $m^2/g$, preferably from about 200–700 $m^2/g$, and preferably from about 400–600 $m^2/g$. At least about 10%, preferably at least about 30%, and more preferably at least about 50% of the surface area of the metal oxide nanoparticles is coated with the coating layer.

The inventive composites comprise from about 50–98% by weight, preferably from about 75–95% by weight, and more preferably from about 80–90% by weight metal oxide nanoparticles, based upon the total weight of the final coated composite taken as 100% by weight. Furthermore, the inventive composites comprise from about 2–50% by weight, more preferably from about 5–25% by weight, and even more preferably from about 10–20% by weight carbon coating layer, based upon the total weight of the final coated composite taken as 100% by weight. The coating layer is graphitic and carbonaceous in nature and will comprise at least about 90% by weight carbon and preferably at least about 98% by weight carbon, based upon the total weight of the coating layer taken as 100% by weight. However, even more preferably, the carbon coating layer is entirely carbon.

There are two preferred methods by which the inventive composites are formed. In one method, a metal alkoxide (e.g., magnesium ethoxide) is decomposed by heating the metal alkoxide to a temperature of at least about 500° C., preferably at least about 600° C., and more preferably from about 600–800° C. This is preferably carried out after the metal alkoxide has been spray dried or otherwise separated from any solvent that may be present. Preferred metal alkoxides include alkoxides of a metal selected from the group consisting of Mg, Sr, Ba, Ca, Ti, Zr, Fe, V, V, Mn, Fe, Ni, Cu, Al, Si, Zn, and Ag. In another embodiment, salts of organic acids (e.g., magnesium acetate) can be used instead of alkoxides.

In the other preferred preparation method, a carbon-rich aerogel is dried under supercritical conditions to yield a composite comprising metal oxide nanoparticles which are at least partially coated with a layer comprising carbon. As used herein, the term "carbon-rich aerogels" refers to aerogels having a carbon content of at least about 5% by weight, preferably from about 5–50% by weight, and more preferably from about 10–40% by weight, based upon the total weight of the aerogel taken as 100% by weight.

Although the preferred carbon-rich aerogels can be prepared by more than one method, one preparation method comprises reacting a metal alkoxide or salt of an organic acid with an organic modifier which has at least one (and preferably at least two) —OR' group, wherein R' is selected from the group consisting of hydrogen and $C_1$–$C_8$ substituted and unsubstituted alkyl groups. The metal oxide or metal alkoxide aerogel can be prepared according to known methods (see, e.g., Utampanya et al., Chem. Mater., 3: 175–181 (1991), incorporated by reference herein) prior to modification with an organic modifier.

Particularly preferred organic modifiers are aromatic, and even more preferably have the formula wherein each R is individually selected from the group consisting of —H and —OR$^1$, where R$^1$ is selected from the group consisting of hydrogen and $C_1$–$C_8$ (and more preferably $C_1$–$C_5$) substituted and unsubstituted alkyl groups. In another embodiment, preferred organic modifiers are hydrocarbons having at least two —OH groups. In yet another embodiment, the organic modifier is a hydrocarbon having at least one —OH group and at least one ether group (each of which is bound to the hydrocarbon) wherein the oxygen atom of the ether group is less than about 4 (and preferably 2) carbon atoms away from the oxygen atom of the —OH group. The most preferred organic modifiers include hydroquinone, resorcinol, methoxyethanol, methoxyphenols, glycerol, and mixtures thereof.

The modification reaction is preferably carried out in the presence of a solvent such as methanol, toluene, and other alcohols or aromatic compounds, and mixtures of the foregoing. The aerogel drying step will be carried out at temperatures of from about 250–300° C. (more preferably from about 260–280° C.) and pressures of from about 4,000–15,000 kPa (more preferably from about 7,000–12,000 kPa).

In another embodiment, the above-described coated nanoparticles can be formed into pellets for use when powder decontaminants are not feasible. These pellets are formed by pressing a quantity of one of these powdered (and coated) metal oxide composites at a pressure of from about 50–6,000 psi, more preferably from about 500–5,000 psi, and most preferably at about 2,000 psi. While pressures are typically applied to the powder by way of an automatic or hydraulic press, one skilled in the art will appreciate that the pellets can be formed by any pressure-applying means, including extrusion. Furthermore, a binder or filler can be mixed with the adsorbent powder, and the pellets can be formed by pressing the mixture by hand. Agglomerating or agglomerated as used hereinafter includes pressing together of the adsorbent powder as well as pressed-together adsorbent powder. Agglomerating also includes the spraying or pressing of the adsorbent powder (either alone or in a mixture) around a core material other than the adsorbent powder. Furthermore, another embodiment is the incorporation of the nanoparticles into films, fibers or coatings as shown in Malchesky et al., Trans. Am. Soc. Artif. Intern. Organs, Vol. XXIII (1977) 659–665, incorporated by reference herein.

In order to effectively carry out the methods of the invention, the pellets should retain at least about 25% of the multi-point surface area/unit mass that the coated metal oxide particles possessed (i.e., of the final composites) prior to pressing together thereof. More preferably, the multi-point surface area/unit mass of the pellets will be at least about 50%, and most preferably at least about 90% of the multi-point surface area/unit mass of the starting coated metal oxide particles prior to pressing. The pellets should retain at least about 25% of the total pore volume of the coated metal oxide particles prior to pressing thereof, more preferably, at least about 50%, and most preferably at least about 90% thereof. In the most preferred forms, the pellets will retain the above percentages of both the multi-point surface area/unit mass and the total pore volume. The pellets normally have a density of from about 0.2 to about 2.0 g/cm$^3$, more preferably from about 0.3 to about 1.0 g/cm$^3$, and most preferably from about 0.4 to about 0.7 g/cm$^3$. The minimum surface-to-surface dimension of the pellets (e.g., diameter in the case of spherical or elongated pellet bodies) is at least about 1 mm, more preferably from about 10–20 mm.

In carrying out the methods of the invention, one or more of the above-described metal oxide particle composites is contacted with the target substance to be sorbed, decontaminated or destroyed under conditions for sorbing, decontaminating or destroying at least a portion of the substance. The methods of the invention provide for destructively adsorbing a wide variety of chemical agents, including agents selected from the group consisting of acids, alcohols, compounds having an atom of a halogen, P, S, N, Se, or Te, hydrocarbon compounds, and toxic metal compounds. The methods of the invention also provide for biocidally adsorbing a wide variety of biological agents, including spores, bacteria, fungi, viruses, rickettsiae, chlamydia, and toxins. Utilizing the metal oxide particulate composites in accordance with the methods of the invention is particularly useful for biocidally adsorbing biological agents such as spore-forming bacteria, especially gram positive bacteria like *B. globigii* and *B. cereus*. In another embodiment, the methods of the invention provide for the destructive adsorption of hydrocarbon compounds, both chlorinated and non-chlorinated.

The contacting step can take place over a wide range of temperatures and pressures. For example, the particulate metal oxide composites can be taken directly to a contaminated site and contacted with the contaminant and/or contaminated surfaces at ambient temperatures and pressures. If the contacting step is to be carried out under ambient temperatures, preferably the reaction temperature range is from about 15–50° C. If the contacting step is to be carried out under high temperature conditions, then preferably the temperature range for the reaction is from about 300–500° C.

If the contacting step is carried out under ambient conditions, the particulate metal oxide composites should be allowed to contact the target substance for at least about 10 minutes, and preferably from about 50–75 minutes. If the contacting step is carried out under high temperatures conditions, then the particulate metal oxide composites should be allowed to contact the target substance for at least about 2 seconds, and preferably for about 3–10 seconds.

If the target substance is a biological agent, the contacting step results in at least about a 90% reduction in the viable units of the biological agent, preferably at least about a 95% reduction, and more preferably at least about a 99% reduction. If the target substance is a chemical agent, the contacting step results in at least about an 80% reduction in the concentration of the chemical agent, preferably at least about a 95% reduction, and more preferably at least about a 99% reduction.

Those skilled in the art will appreciate the benefits provided by the methods of the invention. In accordance with the invention, military personnel can utilize the particulate metal oxides and composites thereof to neutralize highly toxic substances such as nerve agents and biological agents. These particles and composites can be utilized in their non-toxic ultrafine powder form to decontaminate areas exposed to these agents, or the highly pelletized composites can be utilized in air purification or water filtration devices. Other countermeasure and protective uses for the metal oxide particles and composites of the particles include personnel ventilation systems and wide-area surface decontamination. Furthermore, the metal oxide composites may remain airborne, thus providing effective airborne decontamination of chemical or biological agents. Alternately, the composites can be formulated into a cream or other skin applicators or incorporated into or on clothing in order to provide protection to personnel at risk of contacting a dangerous agent.

BRIEF DESCRIPTION OF THE DRAWINGS

FIG. 1 is a graph showing the effect of evacuation temperature on the surface area of AP-MgO and resorcinol-modified MgO (Re-MgO);

FIG. 2 is a graph illustrating nitrogen adsorption/desorption isotherms on Re-MgO-750 (A), Re-MgO-750 after additional calcination at 450° C. under dry air flow (B), and AP-MgO (C);

FIG. 3 is a graph depicting pore volume size distributions for Re-MgO-750 (A), Re-MgO-750 after additional calcination at 450° C. under dry air flow (B), and AP-MgO (C);

FIG. 4*a* is a transmission electron micrograph (TEM) micrograph of Re-MgO-750;

FIG. 4*b* is a TEM micrograph of AP-MgO;

FIG. 5*a* is a high-resolution TEM image of AP-MgO;

FIG. 5*b* is a high-resolution TEM image of Re-MgO-750;

FIG. 6 is a graph showing the activity of carbon-coated MgO and AP-MgO in dehydrochlorination of 1-chlorobutane at 380° C.;

FIG. 7 is a graph depicting the effect of water vapor on the performance of carbon-coated MgO and AP-MgO in dehydrochlorination of 1-chlorobutane at 380° C., with the shaded regions corresponding to periods when water was present in the gas flow;

FIG. 8 is an XRD spectra of C/MgO after treatment in humidity cabinet (A), C/MgO before the treatment (B), AP-MgO (C), and AP-MgO after treatment in humidity cabinet (D); and FIG. 9 is a graph illustrating the kinetics of ethylvinylsulfide formation from 2-chloroethylethylsulfide at room temperature.

DETAILED DESCRIPTION OF THE PREFERRED EMBODIMENT

The following examples set forth the preferred methods of practicing the invention. It is to be understood, however, that these examples are provided by way of illustration and nothing therein should be taken as a limitation upon the overall scope of the invention.

EXAMPLE I

Synthesis of Modified $Mg(OH)_2$ Aerogels

Magnesium methoxide was prepared by dissolving Mg metal ribbon (Fisher) in methanol. A 1 M solution was prepared by the reaction of 4.86 g (0.20 mol) Mg with 206 ml methanol under nitrogen flow at room temperature. After completion of the reaction, the reaction vessel was sealed and stored at room temperature for future use in the synthesis of $Mg(OH)_2$ aerogels.

For preparation of modified MgO aerogels, magnesium methoxide solution obtained via the first step was diluted with a desired amount of methanol and/or other solvent (e.g., toluene). Organic modifying agents and hydrolysis water were dissolved in 10 ml methanol each. Then, the solution of the first modifying agent was quickly poured into the reaction vessel with magnesium methoxide, and the resulting mixture was stirred for 10 min. If two modifying agents were used, the second one was added following a similar procedure. Finally, a stoichiometric amount of hydrolysis water dissolved in methanol was added. The reaction vessel was continuously maintained under nitrogen flow during the whole reaction. The gel formed after adding water was stirred overnight with a magnetic stir bar unless a solid gel was obtained. In the latter case, the gel was aged overnight without stirring. The amounts of solvents were adjusted to provide a pressure of about 7000 kPa at the end of the autoclave treatment (see below). The amounts of the reagents were adjusted accordingly to provide desired concentration.

The aerogels were prepared by high temperature supercritical drying of the gels in a standard one-liter autoclave (Parr). The autoclave with the gel was first flushed with nitrogen for 10 minutes. Then it was filled with nitrogen at an initial pressure of about 700 kPa and sealed. The autoclave temperature was slowly increased up to a desired value at a rate of 1 K per minute and maintained at that temperature for 10 minutes. The final pressure was about 7000 kPa. After completion of the procedure, the pressure was quickly released by venting of solvent vapor. The sample was again flushed with nitrogen for 10 minutes and allowed to cool in nitrogen.

EXAMPLE II

Synthesis of AP-MgO and Carbon-Coated MgO Nanocrystals

AP-$Mg(OH)_2$ was synthesized by a procedure similar to that outlined in Example I without adding any organic modifiers to the magnesium methoxide solution in a toluene-methanol mixture. The material obtained after supercritical drying at 265° C. was subjected to thermal treatment under vacuum at 500° C. to give AP-MgO. A detailed synthesis procedure is set forth in Klabunde et al., *J. Phys. Chem.,* 1996, 100, 12142, incorporated by reference herein.

For synthesis of $Mg(OH)_2$ modified with resorcinol, 20 ml of 1M $Mg(OCH_3)_2$ solution in methanol was mixed with 60 ml toluene in a 250 ml round-bottom flask maintained under flowing nitrogen. Next, 0.33 g (0.0030 mol) resorcinol was dissolved in 10 ml methanol in a beaker, and then 0.72 ml (0.040 mol) $H_2O$ was dissolved in 10 ml methanol in another beaker. The total volume of the solvents was 100 ml, with the toluene/methanol ratio being 1.5. All solutions were homogenized by stirring with magnetic stir bars for 10 min. The solution containing resorcinol was then quickly poured into the flask with magnesium methoxide. The hydrolysis water was added five minutes later when some dark-brown precipitate was formed. The mixture was stirred overnight resulting in the formation of a dark-green gel. The resulting gel was subjected to standard hypercritical drying in the autoclave at 265° C. to yield a fluffy red-brown powder.

The resulting material, denoted as Re-$Mg(OH)_2$, was subjected to heat treatment under vacuum at variable temperatures to give carbon-coated MgO. Samples obtained after evacuation at 500° C. and 750° C. for 3 hours (denoted as Re-MgO-500 and Re-MgO-750, respectively) were used in catalytic experiments.

For synthesis of carbon-coated magnesium oxide from magnesium methoxide, Mg chips (100 g, 4.11 mol) were placed in a stainless steel autoclave, and dry methanol (3168 g, 98 mol) was added. The reaction was allowed to proceed for several hours under a head of nitrogen. The hydrogen gas byproduct was then vented, and the autoclave was purged with nitrogen. The resulting magnesium methoxide product $Mg(OCH_3)_2$ was separated from the excess methanol by spray drying through a 0.5 mm orifice using nitrogen pressure at 150° C. temperature. A portion of this material (0.5 g) was placed on a belt heater system and heat-treated for 1.75 minutes at 650° C. under nitrogen which caused the formation of carbon-coated magnesium oxide (C/MgO).

Characterization of Carbon-Coated MgO Nanocrystals

Textural characterization of the samples was performed on a NOVA 1200 gas sorption analyzer (Quantachrome Corp.). Prior to the analysis the samples were outgassed at 180° C. for 1 hour. Seven point Brunauer-Emmett-Teller (BET) surface areas, total pore volumes, and pore size distributions (BJH method) were calculated from nitrogen adsorption/desorption isotherms.

X-ray powder diffraction experiments were conducted on a Scintag-XDS-2000 spectrometer with Cu Kα radiation. Scans were made in the 2Q range 20–80° with a scanning rate 1° per minute. Crystallite sizes were determined from X-ray line broadening using the Scherrer equation.

IR spectra were recorded using a Mattson RS-1 research series FTIR spectrometer with nitrogen purge and a HgCdTe detector. All spectra were obtained as the FT average of 64 scans with a resolution of 1 $cm^{-1}$.

TEM studies were performed on a Philips CM100 electron microscope operating at 100 kV. The samples were prepared by suspending powders (~1%) in methanol with the following ultrasound treatment. Holey amorphous carbon grids were used as supports.

Dehydrochlorination of 1-chlorobutane was performed in a flow reactor. Next, 99% 1-chlorobutane (Aldrich) used in the experiments was introduced into the reactor by saturation of the argon flow with $C_4H_9Cl$ vapor (10 ml injections) at room temperature. The experiments were performed at 380° C., the volume flow rate was about 2 l/h, and the catalyst loading was equal to 0.02 g. The composition of the product after the reactor was analyzed by gas chromatography. Prior to each experiment, the catalyst was activated in an argon flow at 500° C. for 1 h for removal of adsorbed water.

The destructive adsorption of 2-chloroethylethylsulfide (2-CEES) on nanocrystalline MgO has been described earlier. Lucas et al., *Nanostruct. Mater.*, 1999, 12, 179, incorporated by reference herein). Briefly, dry MgO nanocrystals were treated with liquid 2-CEES in an evacuated chamber at room temperature. A major product of this treatment is dehydrohalogenated vinyl compound ethylvinylsulfide ($CH_3CH_2SCH=CH_2$) which is volatile and, under reduced pressure, passed into the gas phase above the MgO sample where it was detected by infrared spectroscopy.

Results and Discussion

1. Modification of $Mg(OH)_2$ Aerogels

One of the most versatile modern methods for preparing inorganic materials from molecular precursors is the sol-gel process. Organic groups used for modification of typical metal alkoxide precursors in the sol-gel process can serve two different purposes: i) to control the reaction rates of the reactants as well as the homogeneity and microstructure of derived gels being degraded during subsequent calcination to give purely inorganic materials; or ii) to modify or functionalize the oxide material.

The latter approach was applied in the synthesis of oxide nanocrystals coated with carbonaceous structures. Nanostructures of this type were created very effectively by controlled pyrolysis of organically modified aerogels. The organic groups were located at the surface of the oxide, and their relatively homogeneous distribution resulted in a higher number of well-distributed nucleation centers during the pyrolysis leading to smaller carbon particles. To achieve a high carbon content in the pyrolysed sample and to retain a large percentage of carbon during pyrolysis, aerogels substituted with large, preferably aromatic, organic groups are particularly well suited (see, U. Schubert, *J. Chem. Soc., Dalton Trans.*, 1996, 3343, incorporated by reference herein). Owing to the arrangement of the carbon structures generated during pyrolysis, a relatively small amount of carbon could allow for efficient coating of the oxide skeleton.

The effect of the addition of several acids, b-diketones and aromatic alcohols, as well as the effect of toluene in the magnesium methoxide solution were studied as they related to the gelation behavior and properties of the resulting MgO aerogels. Strong complexing agents, such as b-diketones, polyhydroxylated ligands, and hydroxyacids have been successfully used for synthesis of modified zirconia and titania gels (Schubert et al.; *Chem. Mater.*, 1995, 7, 2010; C. Sanchez et al.; In, *J. Non-Cryst. Solids*, 1992, 147&148, 1, incorporated by reference herein). Such complexing agents are more stable towards hydrolysis than alkoxy groups. Therefore, upon hydrolysis many of such groups remain bound to metal atoms while alkoxy groups are quickly removed. Thus, these agents play a key role during condensation acting as termination sites. Usually, such ligands end up on the surface of resulting zirconia or titania particles, and it is often possible to control the size of the nanoparticles by varying the relative concentration of the ligands.

Similar to the effects found with zirconia and titania gels, addition of acetylacetone, acetic acid, and $HNO_3$ in the production of $Mg(OH)_2$ prevented precipitation and resulted in a noticeable increase of the gel time and often the formation of nice clear gels. Hard clear gels, which are often desirable during the synthesis of other metal oxide aerogels (see, Bedilo et al.; *Nanostruct. Mater.*, 1997, 8, 119; L. K. Campbell et al., *Chem. Mater.*, 1992, 4, 1329, incorporated by reference herein) could be easily obtained at $Mg(OCH_3)_2$ concentration of 0.5 M after the acid addition. However, initial attempts to apply such modification to the synthesis of $Mg(OH)_2$ yielded materials with very low surface areas. Addition of modifiers as acetic acid, benzoic acid, nitric acid, acetylacetone or benzoylacetone resulted in a surface area decrease from about 300 $m^2/g$ to 50–75 $m^2/g$.

The use of toluene and other aromatic compounds such as benzene and mesitylene as co-solvents resulted in the formation of clear gels eliminating the need for addition of acids and a noticeable increase in the surface area of resulting aerogels (up to 1150 $m^2/g$ at toluene/methanol ratio equal to 5). These data are in good agreement with the reported favorable effect of toluene on the textural properties of MgO aerogels (Klabunde et al., *J. Phys. Chem.*, 1996, 100, 12142; S. Utamapanya et al., *Chem. Mater.*, 1991, 3, 175, incorporated by reference herein). Its presence is believed to accelerate both the hydrolysis and gelation processes (Diao et al.; *Chem. Mater.*, 2002, 14, 362, incorporated by reference herein).

The known preparation procedure for the synthesis of high-surface area AP-MgO nanocrystals involves the addition of toluene as a second solvent and results in the rapid formation of a soft nearly liquid gel. Meanwhile, in the absence of any modifiers, the water addition to the $Mg(OCH_3)_2$ solution in methanol brings about slow gelation with visible formation of a precipitate so that the resulting solid does not possess as high a surface area or desirable porous structure after the supercritical drying. In other words, the use of toluene as a cosolvent has a definite beneficial effect.

Although toluene is not the only compound with such effect, it is the most convenient for practical use, being less toxic than benzene and more volatile than heavier organic solvents. The autoclave temperature of 265° C. employed in the standard procedure for the preparation of AP-MgO is above critical for methanol, but not for toluene. Moreover, the lack of complete elimination of the surface tension under these conditions does not seem to have a significant detrimental effect on the properties of the aerogels. The use of benzene as a co-solvent and drying temperature of 295° C. that is above critical for benzene did not bring higher surface area of the dried material.

Very significant results were obtained with bidentate compounds of other types, e.g., hydroxyphenols were used in the synthesis. The addition of resorcinol or hydroquinone led to a gradual formation of intensively colored precipitates, which were dark brown in the case of resorcinol and bright green in the case of hydroquinone. Reactions taking place at this stage involve alcohol exchange reactions (1)–(3) below (resorcinol reactions). The product formed in reaction (3) can participate in further alcohol exchange reactions that eventually can lead to the formation of relatively large oligomers precipitating out of the solution. The average size of these oligomeric species depends on the absolute and relative concentrations of magnesium methoxide and resorcinol. The use of a higher relative resorcinol concentration results in the formation of larger oligomers.

TABLE 1

Properties of Mg(OH)$_2$ Aerogels Modified with Resorcinol (MeOH/toluene = 2:3)

| Re/Mg, mol/mol | Surface Area, m$^2$/g | Pore Volume, cm$^3$/g | Average pore radius, Å | BET C | Density, g/cm$^3$ |
|---|---|---|---|---|---|
| 0 | 681 | 3.49 | 102 | 79 | 2.55 |
| 0.02 | 888 | 4.13 | 93 | 56 | 2.27 |
| 0.05 | 1019 | 1.77 | 35 | 37 | 2.63 |
| 0.1 | 1198 | 1.48 | 25 | 39 | 2.71 |
| 0.15 | 1095 | 1.26 | 23 | 46 | 2.91 |
| 0.2 | 1057 | 1.29 | 24 | 47 | 2.82 |

Hydroquinone addition had a similar effect on the properties of the aerogels, but the maximum surface areas in this case did not exceed 750 m$^2$/g. It is believed that the favorable effect of both compounds on the properties of the aerogels is due to their coordination to two different Mg atoms of the same nanoparticle. In this case, it would be much more difficult to remove them during the hydrolysis step, in comparison with monodentate alkoxy ligands. Thus, if no excess water is used for hydrolysis, they will stay on the surface of the nanoparticles and contribute to other factors limiting their growth, acting similar to the way strong complexing ligands act in zirconia and titania gels. The superior effect of resorcinol in comparison with hydroquinone may be explained by the fact that its geometry should favor bonding to the Mg atoms of the same nanoparticle rather than of two different ones.

Based on these results, resorcinol was chosen as the most promising modifying agent, and materials modified with it

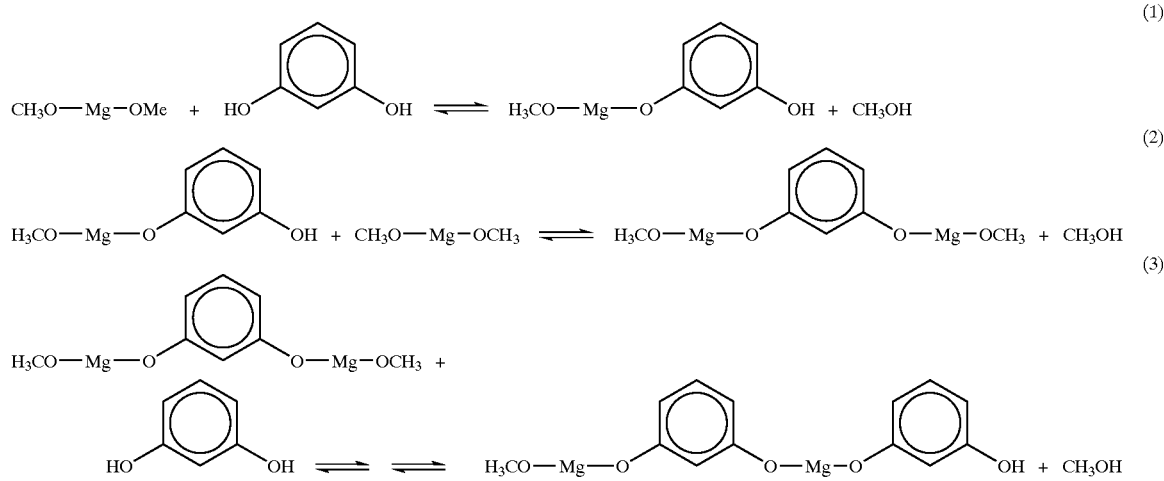

were studied in more detail. A sample with a resorcinol concentration 0.15 mol/mol was synthesized in a larger amount and used for further thermal treatment to form carbon-coated MgO.

2. Carbon-Coated MgO Prepared from Modified Aerogel

Resorcinol-modified aerogels proved to have significantly higher thermal stability than typical AP-MgO. For example, the surface area of the carbon-coated gel after thermal treatment at 600° C. under vacuum is as high as 670 m$^2$/g, exceeding that of AP-MgO by a factor of 2.5 (FIG. 1).

After autoclave drying, resorcinol-modified aerogels do not exhibit any crystalline pattern. Samples subjected to heat treatment at 500° C. or above show the pattern typical for magnesium oxide. The average crystalline size increases from 1.4 nm for the sample evacuated at 500° C. to 2.8 nm After the hydrolysis step, the resorcinol-based solutions were transformed into gels with intensive green color. Materials prepared with resorcinol as the only modifier with a methanol-toluene mixture used as a solvent preserved high surface areas (>1000 m$^2$/g) up to resorcinol concentrations of 0.2 mol/mol (Table 1). The resorcinol introduction and increase of its concentration to 0.1 mol/mol resulted in a significant increase in the surface area of the aerogels, accompanied by a decrease in the pore volume and corresponding decrease of the average pore size. Further increases of the resorcinol concentration brought lower surface areas and pore volumes without any significant alteration in the average pore size. At higher resorcinol concentrations (>0.2 mol/mol) precipitation became very significant, and the gels became inhomogeneous.

for the sample treated at 750° C. Both are significantly lower than the value of 3.8 nm obtained for AP-MgO after a 500° C. treatment. The formation of carbon nanoparticles on the surface of MgO nanoparticles significantly retards sintering of the latter up to very high temperatures if heated under vacuum, although does not eliminate it completely.

Figure 2:
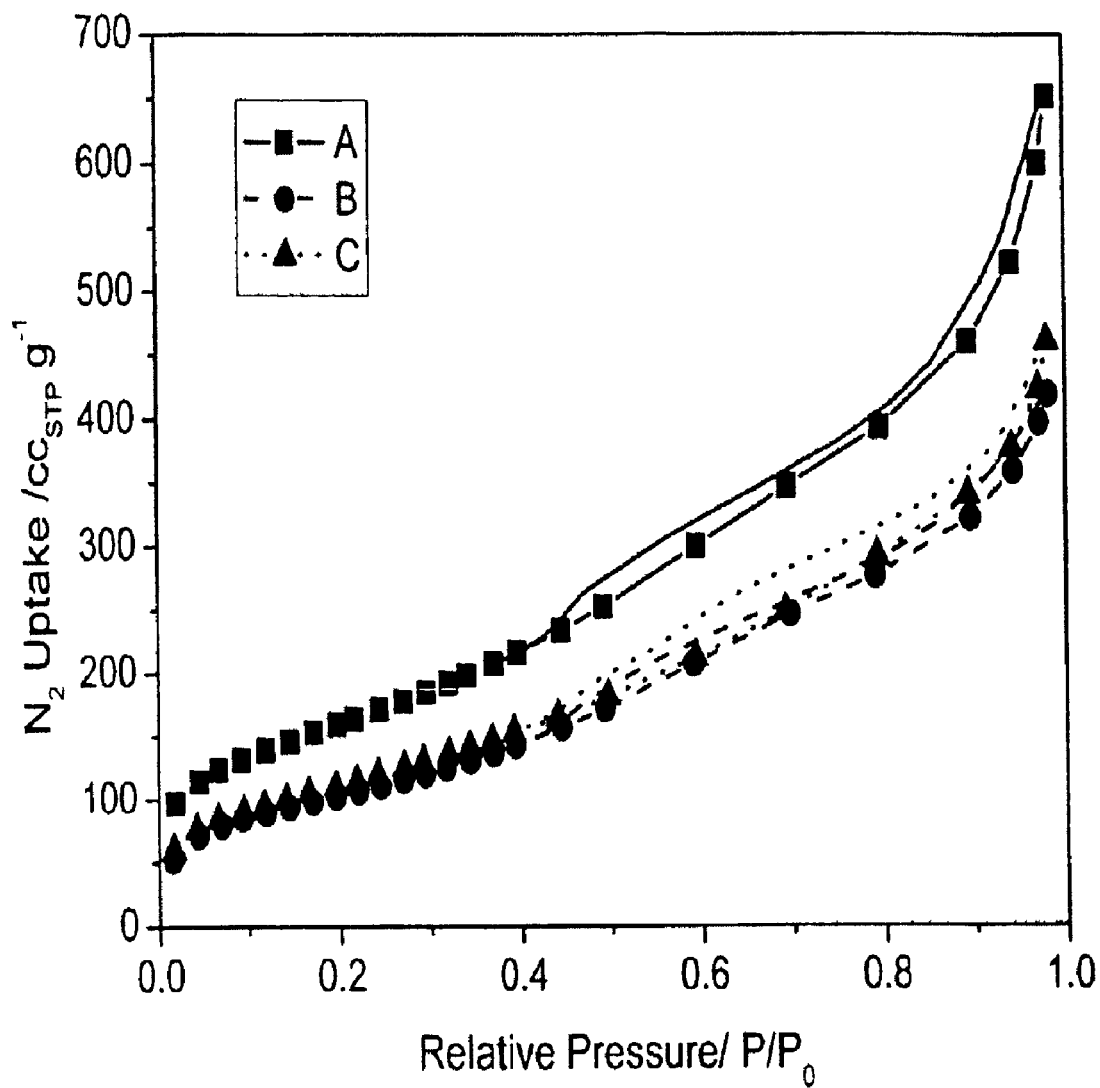
Figure 3:
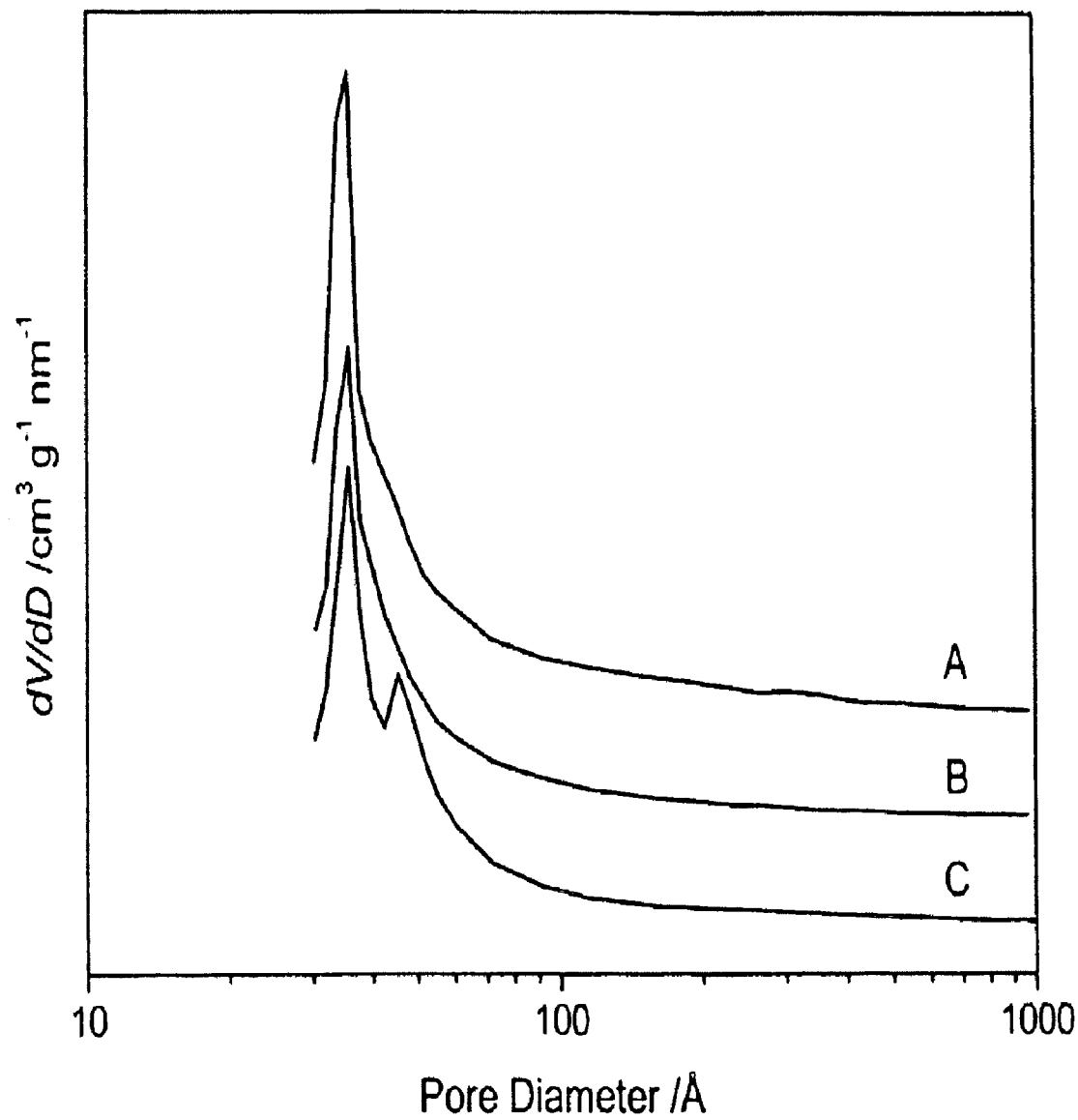

Nitrogen adsorption/desorption isotherms measured at 77K for the resorcinol-modified sample heat treated at 1023K in dynamic vacuum, and in dry air flow at 723K are shown in FIG. 2. Data for regular AP-MgO are presented for comparison. Pore volume-size distributions (PVSD) calculated from desorption branches by BJH method are shown in FIG. 3.

The specific surface area of starting carbon-coated sample Re-MgO-750 is very high (593 m$^2$/g). As one can see, burning carbon off results in some decrease in the specific surface area, but does not affect the shape of PVSD considerably. The peak at 3.5 nm is observed on all PVSDs, including AP-MgO. Nitrogen adsorption isotherms for the sample with carbon burnt off and usual AP-MgO are similar, except for some deviations in the shape of the hystersis loops which are observed more clearly for AP-MgO. The similarity of N$_2$ adsorption isotherms is an evidence of similar texture of both samples. The specific surface areas are 429 and 463 m$^2$/g for Re-MgO-750 with carbon burnt off and AP-MgO, respectively. The mean sizes of the nanoparticles can be estimated as 4.5 and 4.2 nm, respectively, assuming the true density of the MgO phase to be 3.1 g/cc.

Figure 4A:
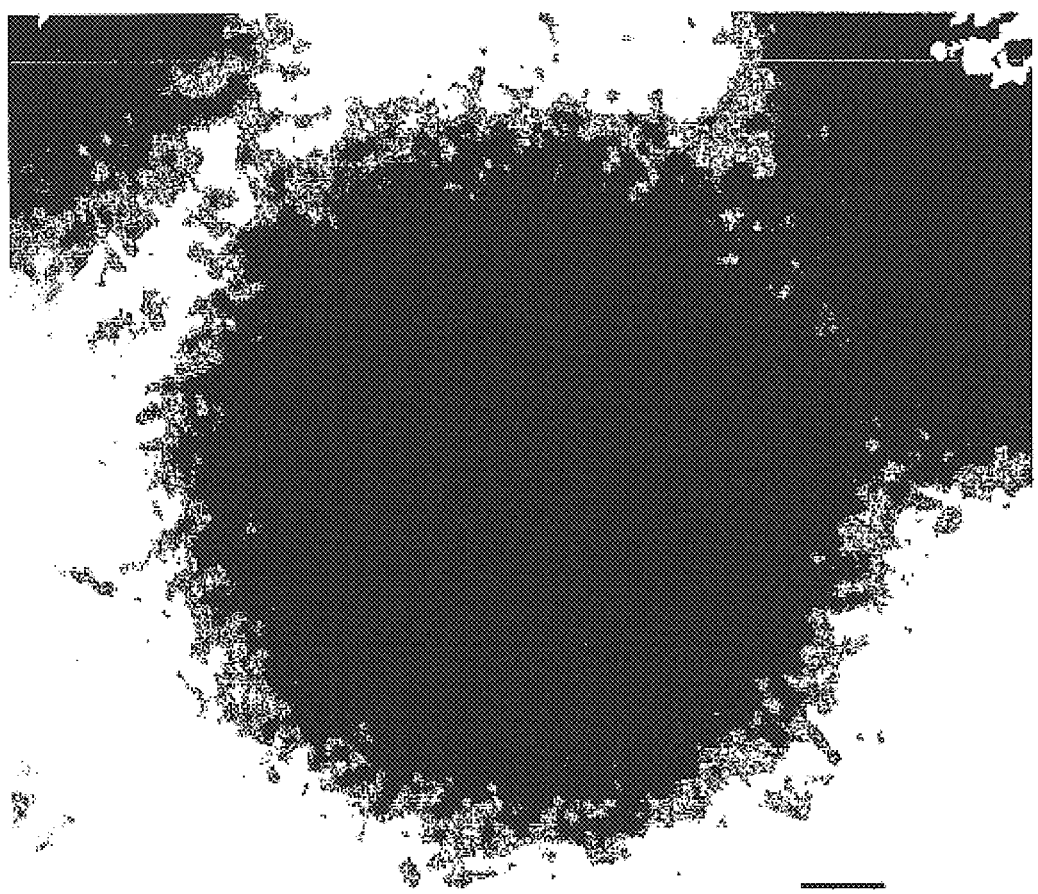
Figure 4B:
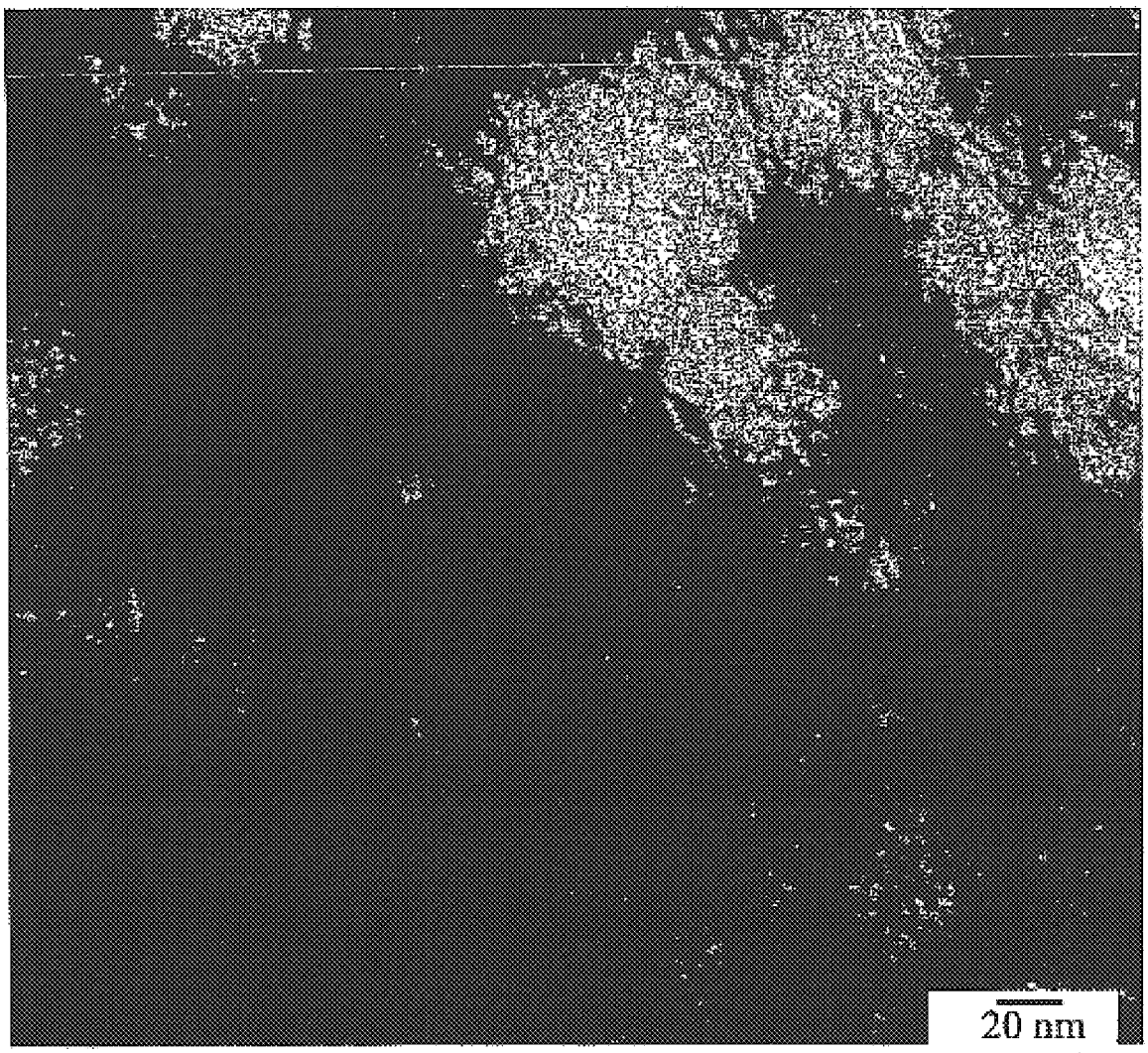

These data indicate that the introduction of the carbon precursor at the preparation stage does not considerably affect the texture of the MgO phase. The main difference here is in the organization of MgO nanoparticles in aggregates as shown in TEM images presented in FIGS. 4a and 4b. It can be seen that carbon-coated samples (FIG. 4a) consist of many tiny spherical particles assembled into larger spheres while the AP-MgO (FIG. 4b) has a distinctly different, much more complex structure.

Figure 5A:
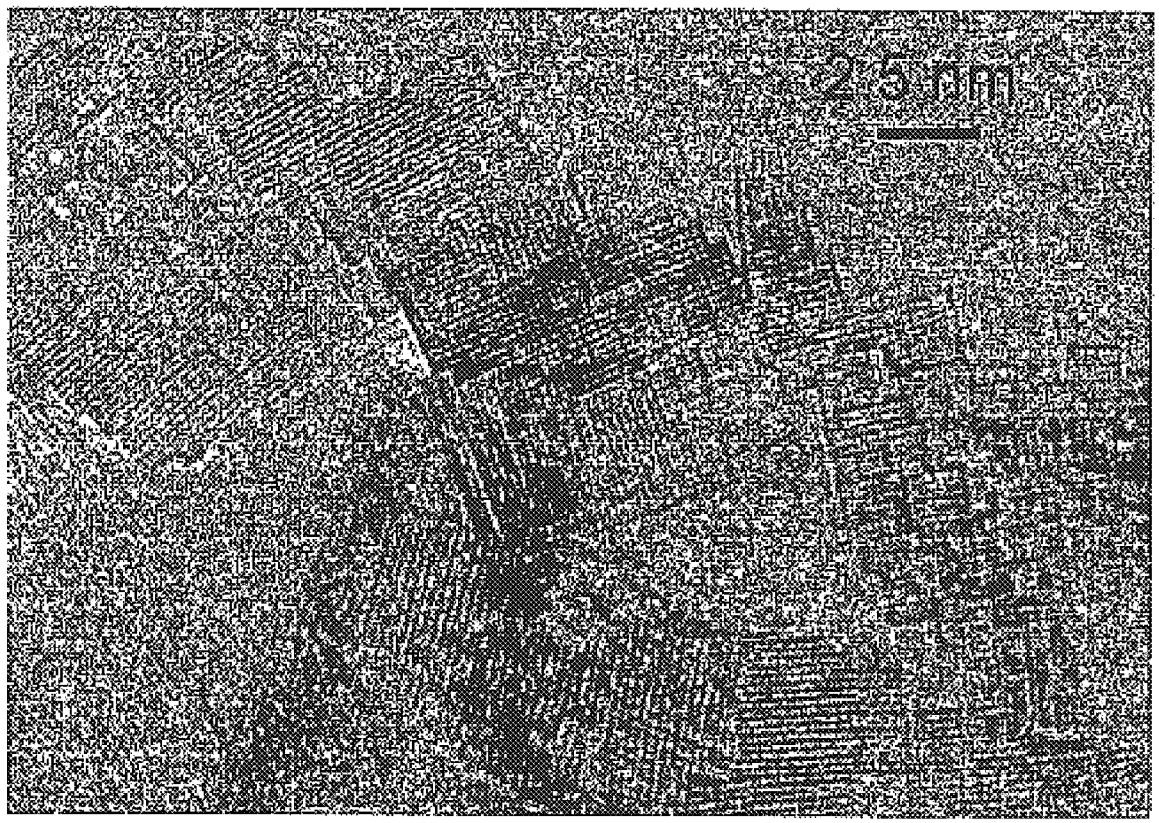
Figure 5B:
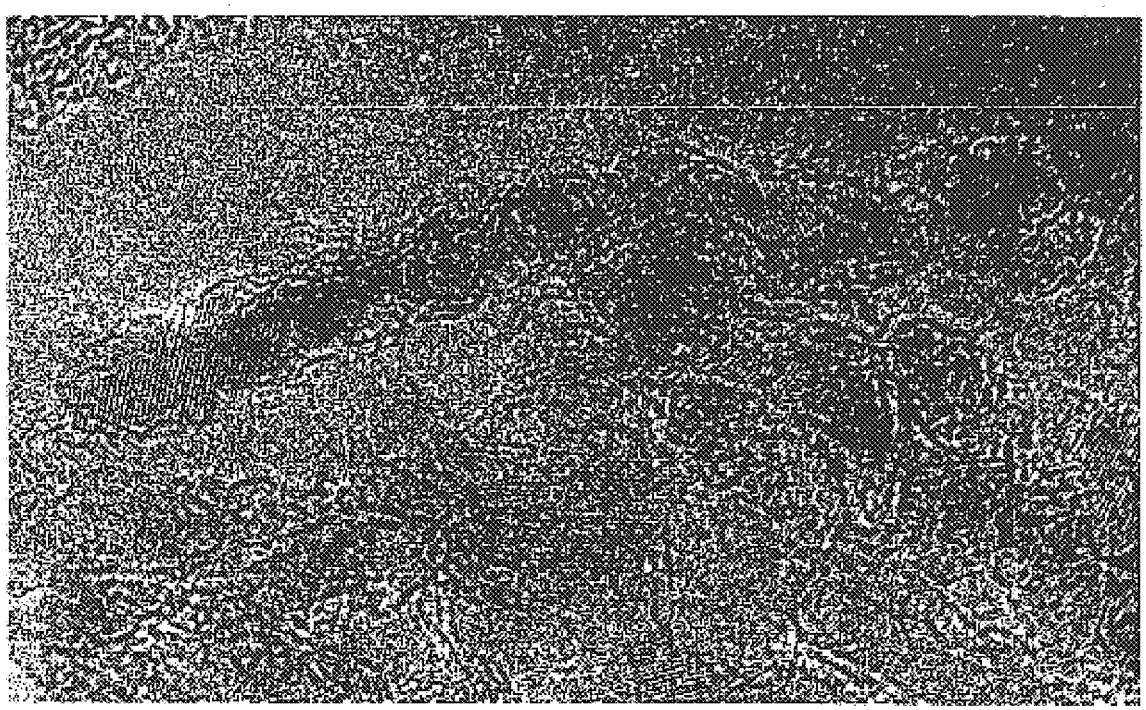

FIG. 5a presents high resolution TEM images of the AP-MgO sample. At high magnification it can be seen that the sample consists of 4–6 nm crystallites arranged into chains forming a very porous secondary structure. The abundance of pores of different sizes gives AP-MgO a high value of accessible surface area. The C/MgO composite can be considered as interlinked MgO nanocrystals, covered by carbon, which does not significantly influence the texture of the MgO carcass. Generally, this is confirmed by the high resolution image of the as-prepared C/MgO composite shown in FIG. 5b. The MgO nanoparticles are covered by thin (thickness equivalent to 2–3 coplanar packed graphite monolayers) twisted carbon fragments (black lines on the image).

Catalytic properties of carbon-coated MgO aerogels were compared to those of AP-MgO using dehydrochlorination of 1-chlorobutane as a model reaction. Recently, it has been shown that AP-MgO is active in this reaction, yielding HCl and butene isomers as reaction products (see, Mishakov et al., *J. Catal.*, 2002, 206, 40; Fenelonov et al., *J. Phys. Chem. B*, 2001, 105, 3937, each incorporated by reference herein). As the reaction proceeds, MgO is partially converted to MgCl$_2$, and the resulting material appears to be a very active and stable catalyst. Unfortunately, with unmodified MgO, this process is accompanied by a significant drop in the surface area.

FIG. 5 illustrates typical changes in 1-chlorobutane conversion with injection number. The total of 10 injections corresponds to the molar amount of 1-chlorobutane exceeding that of the MgO in the catalyst by a factor of 2.5–4, depending upon the amount of carbonaceous residues in the latter. It can be seen that the activity of a typical AP-MgO sample starts at a relatively low value and grows during the first 4–5 injections, in agreement with the fact that it undergoes partial conversion to MgCl$_2$, the latter being a better catalyst.

Resorcinol-modified samples evacuated at 500° C. show an opposite behavior, i.e., the activity starts at a much higher value due to their higher surface area and then goes down. Despite differences in the starting and final activities, this trend was the same for all resorcinol-modified samples activated at 500° C. studied. Apparently, this temperature was not sufficient for complete conversion of organic groups on the MgO surface to carbon. This is evidenced by the dark-brown color of the samples, elemental analysis data, and typical C—H stretches observed in the IR spectra. According to the elemental analysis, Re-MgO-500 had 13.7 wt. % carbon and 1.8 wt. % hydrogen, the latter value being well above the amount typical for pure MgO nanoparticles. It appears that these carbonaceous residues block more and more significant portion of the surface as the reaction goes on, thus limiting access to the catalytically active surface sites.

The heat treatment at a higher temperature (750° C.) eliminated this drop in the activity and preserved it at a high starting value. According to the elemental analysis, Re-MgO-750 had 10.2 wt. % carbon and 0.5 wt. % hydrogen. As evidenced by the FTIR data, the latter was mostly present in the form of OH groups, with no C—H stretches observed. The sample was black in color, and most of the surface organic groups had evidently been converted to carbon.

The carbon coating had no apparent effect on the catalyst selectivity. The selectivity to butene was close to 100%, 2-chlorobutane formed in very small amounts being the only by-product. Three butene isomers—1-butene, cis-2-butene and trans-2-butene—were formed in significant and comparable amounts on all the catalysts studied.

Figure 6:
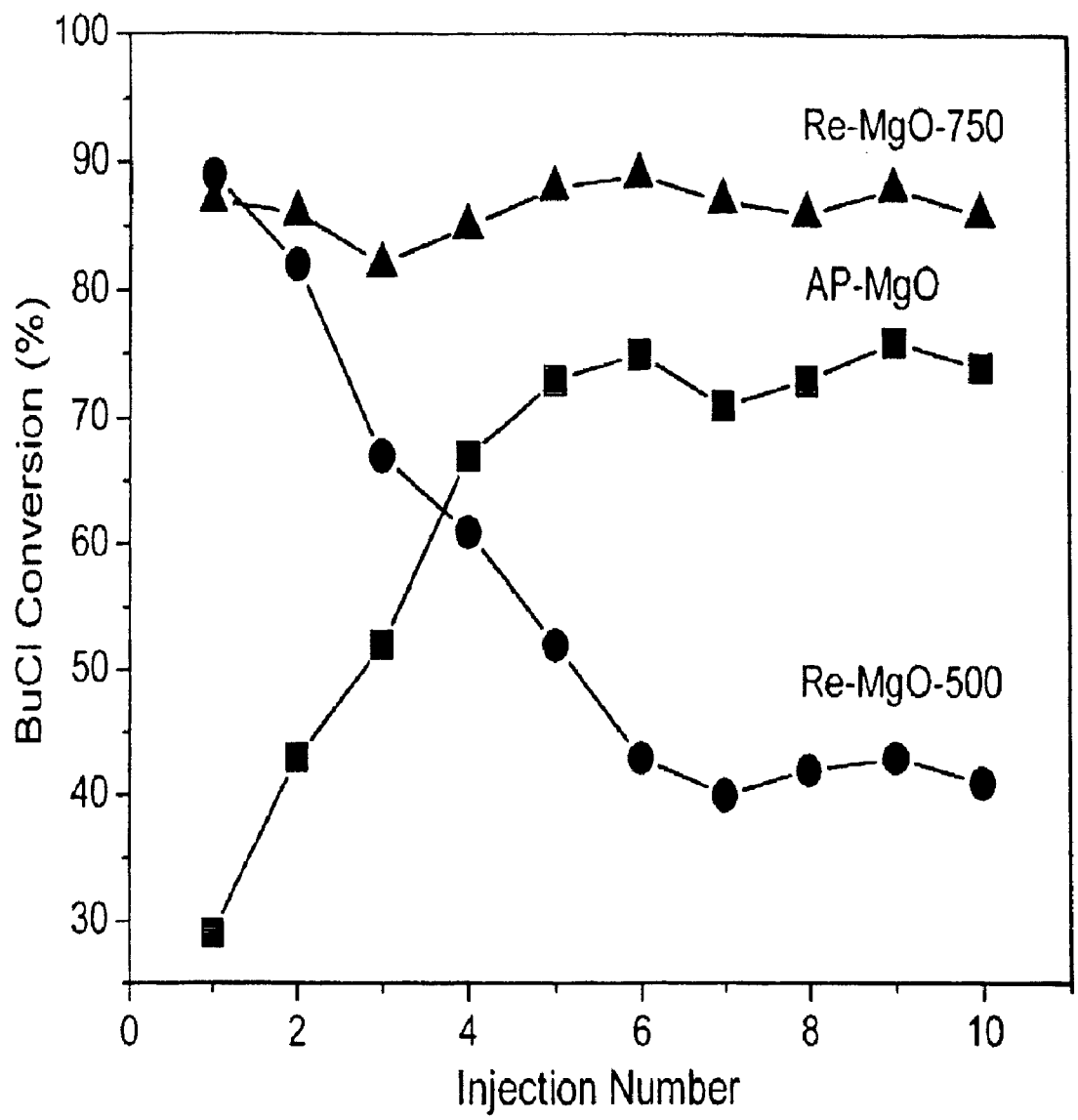

FIG. 6 illustrates the effect of water poisoning on the activity of the same AP-MgO and carbon-coated samples described above. The experiments were performed as follows: 50 ml of water were injected into the saturator after the catalyst activation. The first chlorobutane injection was made approximately in 15 minutes after the water injection, so that water was still present in the flow during the first injection but not during injections 2 through 7. Then, 50 ml of water was injected again immediately followed by the chlorobutane injections made every 5 minutes. In this case, water was present in the flow during injections 8 through 11. The results indicate that although water does have a significant detrimental effect on the performance of both catalysts, the carbon-coated sample is much more stable than standard AP-MgO.

3. Pyrolysis Route for Synthesis of Carbon-Coated MgO

Another technique used for preparation of carbon-coated MgO nanoparticles involved direct decomposition of magnesium methoxide. Magnesium methoxide separated by spray drying from excess methanol was decomposed at 650° C. under nitrogen. The thermal driven chemical reaction is assumed to have the following stoichiometry:

$$(CH_3)_2Mg \xrightarrow{650° C.} C/MgO + CH_4 + H_2O \tag{4}$$

In this way 0.5 g (CH$_3$O)$_2$Mg yielded 0.21 g C/MgO product, or 69% based on equation 4, that had a surface area of 260 m$^2$/g. Although the surface area of this sample is significantly lower than that of the material prepared from resorcinol-modified Mg(OH)$_2$ aerogel, this implementation is much more economical as it avoids the use of a large amount of toluene and the supercritical drying procedure.

Figure 7:
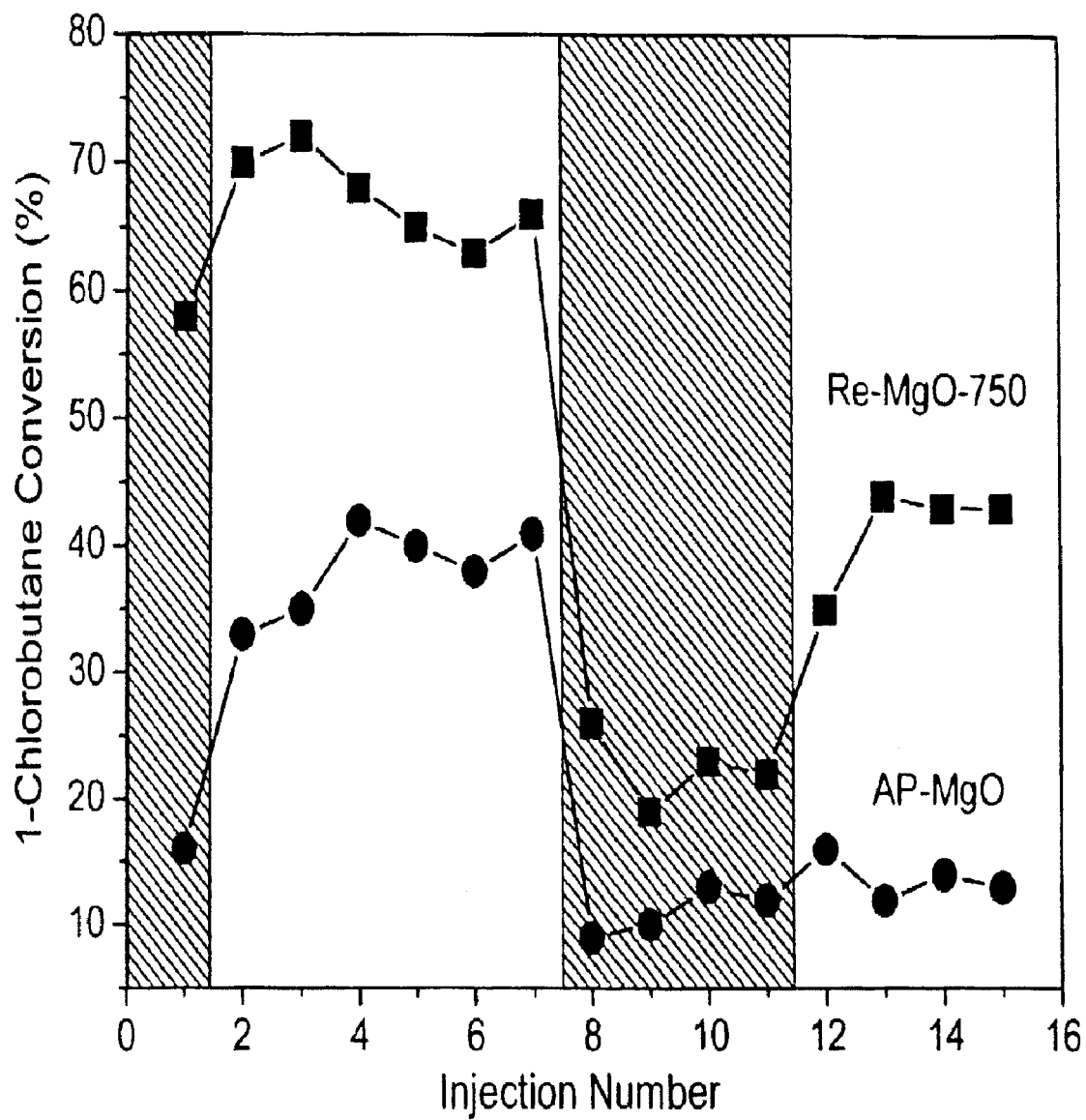

Powder X-ray diffraction (XRD) showed peaks indicative of nanocrystalline MgO (FIG. 7, spectrum 1). No peaks were observed for carbon, indicating that the graphitic portion is noncrystalline as is commonly the case with graphitic activated carbon.

The effect of humidity on the crystalline structure of C/MgO was studied by placing the sample into a humidity cabinet at 62% humidity for 24 hours. According to XRD, such humidity treatment caused no change in the composition or crystallite size of C/MgO (FIG. 7, spectrum 2). However, a MgO sample of the same crystallite size, but not coated with carbon was converted substantially to Mg(OH)$_2$ crystallites by the same humidity treatment (FIG. 7, spectra 3 and 4). These results clearly show that the carbon coating did protect the MgO crystallites substantially from conversion to hydroxide under the action of water vapor.

Figure 8:
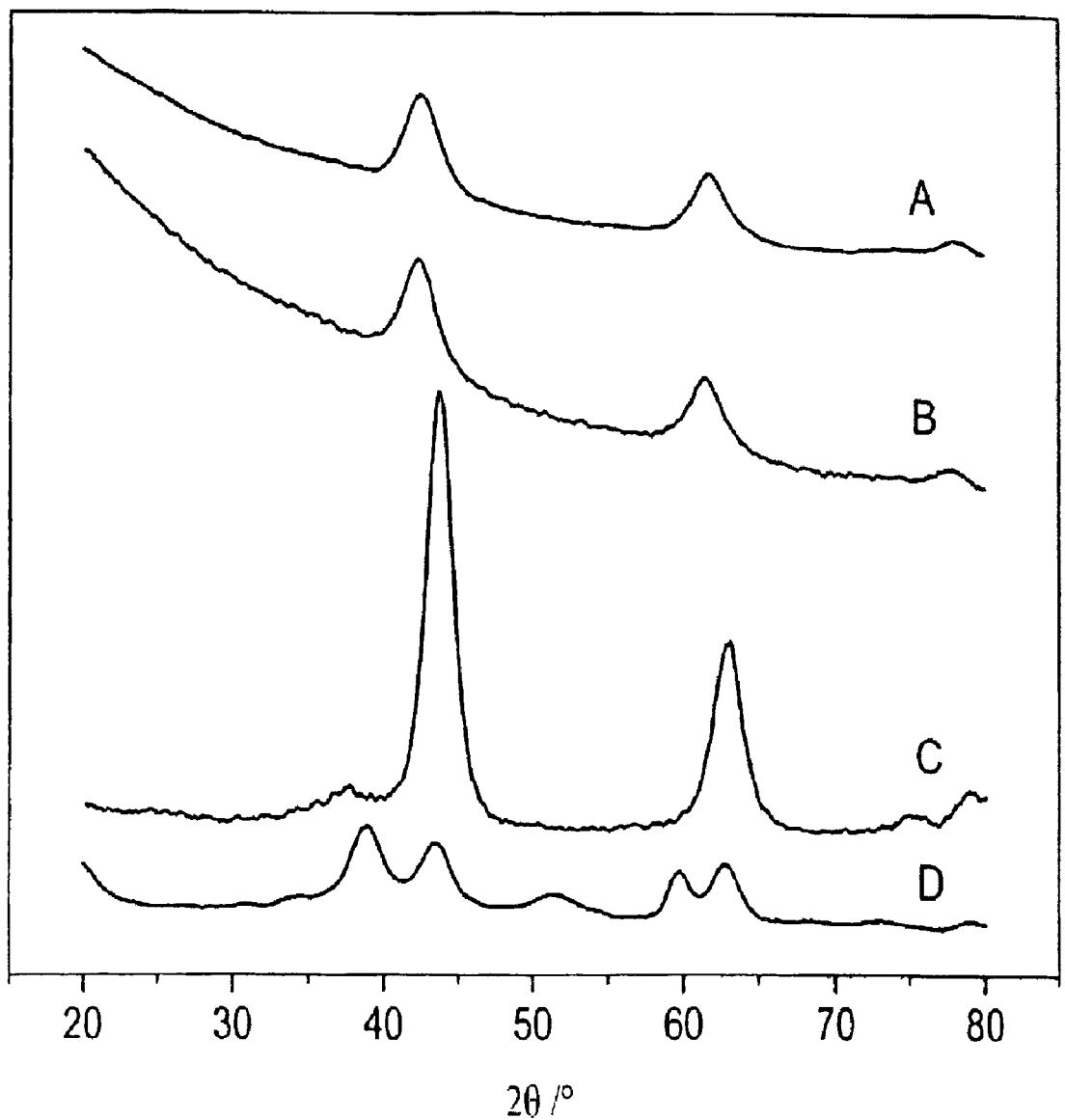
Figure 9:
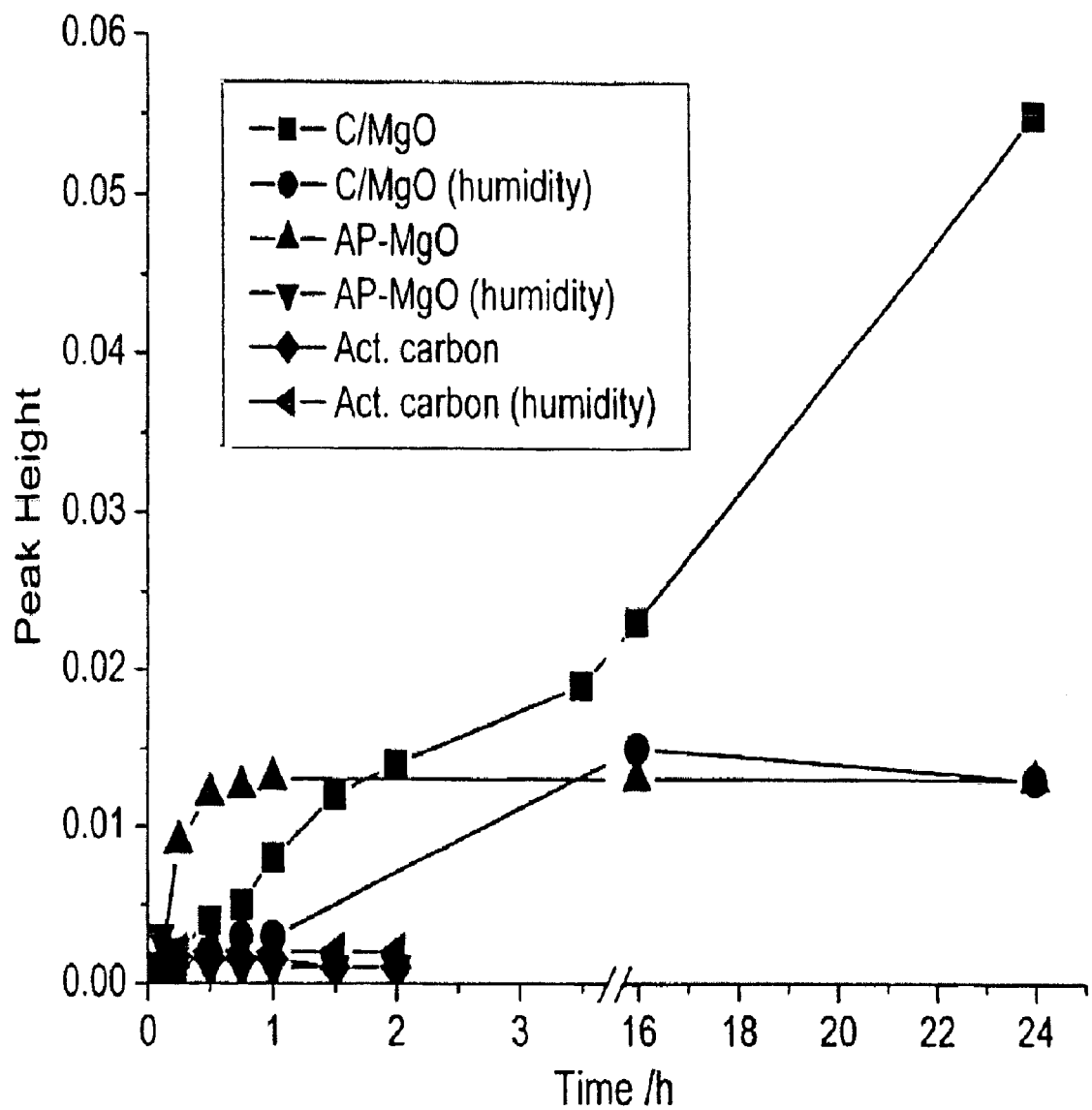

2-CEES is a mimic of mustard gas, which is a warfare agent. Earlier destructive adsorption of 2-CEES has been shown to take place on nanocrystalline MgO at room temperature, the main reaction product being dehydrohalogenated vinyl compound ethylvinylsulfide (CH$_3$CH$_2$SCH=CH$_2$). When a C/MgO sample was treated in the same way, ethylvinylsulfide was formed as well. FIG. 8 illustrates the formation of this product vs. time. Note that activated carbon gives no vinyl product, while the rates of its generation over MgO and C/MgO are comparable. These results indicate that the structure of C/MgO does allow 2-CEES to interact with the MgO core, so that the reaction takes place, and the vinyl product is released into the gas phase.

An identical test was carried out with C/MgO treated for 24 hours under 62% humidity. Again, 2-CEES did react, and the vinyl product was released, although more slowly (FIG. 8). The humidity-treated, uncoated MgO reacted much slower. So, once again, although water did have a somewhat detrimental effect on the performance of the destructive adsorbent in this reaction, the carbon coating was effective to provide significant protection to the MgO core.

C/CaO and C/SrO samples having similar properties to the C/MgO discussed above were also prepared. In both cases, the addition of carbon helped to prevent the oxide sintering and improved stability with respect to poisoning. C/CaO with a surface area of 275 m$^2$/g was synthesized with methoxyethanol being used as a modifying agent. It showed exceptional activity and good stability in dehydrochlorination of 1-chlorobutane. C/SrO with a surface area of 155 m$^2$/g was synthesized with 2-methoxyphenol used as a modifying agent. The material exhibited good activity in the reaction of 2-CEES. For comparison, typical surface areas of CaO and SrO without the carbon modification prepared by the modified aerogel technique employed in our syntheses are 120 and 20 m$^2$/g, respectively.

The above examples establish that carbon-coated nanocrystalline oxides can be prepared by two different methods. The MgO samples have small particle size and high reactivity comparable to those of AP-MgO, while their stability with respect to water is significantly improved. Direct pyrolysis of magnesium methoxide represents a cheap and efficient pathway to synthesis of nanocrystalline carbon-coated MgO. Modification of the gel with resorcinol or other organic ligand proved to be a convenient way to prepare carbon-coated nanocrystalline MgO with higher surface area, smaller crystallite size and better stability than traditional nanocrystalline AP-MgO. With minor modification these methods are also applicable for the preparation of a wide variety of carbon-coated metal oxides (MgO, CaO, SrO, BaO, Al$_2$O$_3$, ZnO, TiO$_2$, ZrO$_2$, NiO, Fe$_2$O$_3$, and others) of different particulate sizes.

We claim:

1. A method of sorbing a target substance comprising the steps of:
   providing a quantity of a composite comprising metal oxide nanoparticles which are at least partially coated with a layer comprising carbon; and
   contacting said composite with a target substance under conditions for sorbing at least a portion of said target substance.

2. The method of claim 1, wherein said target substance is selected from the group consisting of acids, alcohols, compounds having an atom of a halogen, P, S, N, Se, or Te, hydrocarbon compounds toxic metal compounds, bacteria, fungi, spores, viruses, rickettsiae, chlamydia, and toxins.

3. The method of claim 1, wherein said contacting step takes place for at least about 10 minutes under ambient conditions.

4. The method of claim 1, wherein said contacting stop takes place for at least about 2 seconds at a temperature of from about 300–500° C.

5. The method of claim 1, wherein said target substance is selected from the group consisting of spores, bacteria, fungi, viruses, rickettsiae, chlamydia, and toxins, and said contacting step results in at least about a 90% reduction in the viable units of said target substance.

6. The method of claim 1, wherein said target substance is selected from the group consisting of acids, alcohols, compounds having an atom of a halogen, P, S, N, Se, or Te, hydrocarbon compounds, toxic metal compounds, and said contacting step results in at least about a 80% reduction in the concentration of said target substance.

7. The method of claim 1, said metal oxide nanoparticles being selected from the group consisting of MgO, SrO, BaO, CaO, TiO$_2$, ZrO$_2$, FeO, V$_2$O$_3$, V$_2$O$_5$, Mn$_2$O$_3$, Fe$_2$O$_3$, NiO, CuO, Al$_2$O$_3$, SiO$_2$, ZnO, and Ag$_2$O nanoparticles, and mixtures of the foregoing.

8. The method of claim 1, said composite having an average crystallite size of from about 3–60 nm.

9. The method of claim 1, said composite having a multi-point surface area of from about 30–700 m$^2$/g.

10. The method of claim 1, wherein said nanoparticles are in the form of a self-sustaining body.

11. The method of claim 10, wherein said body has a multi-point surface area which is at least about 25% of the multi-point surface area of the composite prior to being formed into a self-sustaining body.

12. The method of claim 10, wherein said body has a total pore volume which is at least about 25% of the total pore volume of the composite prior to being formed into a self-sustaining body.

13. The method of claim 1, wherein said layer is at least about 90% by weight carbon, based upon the total weight of the layer taken as 100% by weight.

14. The method of claim 1, wherein said composite comprises from about 50–98% by weight metal oxide nanoparticles, based upon the total weight of the composite taken as 100% by weight.

15. The method of claim 1, wherein said composite comprises from about 2–50% by weight of said layer, based upon the total weight of the composite taken as 100% by weight.

16. The method of claim 1, wherein said nanoparticles have a surface area, and at least about 10% of said surface area is covered with said layer.

17. The method of claim 1, said layer having a thickness of less than about 10 Å.

18. A method of forming an adsorbent composite, said method comprising the step of decomposing a metal alkoxide or a salt of an organic acid by heating the metal alkoxide to a temperature of at least about 500° C. to yield a metal oxide having a surface which is at least partially coated with a layer comprising carbon.

19. The method of claim 18, further including the step of spray drying said metal alkoxide prior to said decomposing step.

20. The method of claim 18, wherein said metal alkoxide is an alkoxide of a metal selected from the group consisting of Mg, Sr, Ba, Ca, Ti, Zr, Fe, V, V, Mn, Fe, Ni, Cu, Al, Si, Zn, Ag, and mixtures thereof.

21. A method of preparing an adsorbent composite, said method comprising the steps of:

providing a quantity of a carbon-rich aerogel; and drying said aerogel under conditions to yield an adsorbent composite comprising metal oxide nanoparticles which are at least partially coated with a layer comprising carbon.

22. The method of claim 21, wherein said aerogel can be formed by reacting a metal alkoxide or salt of an organic acid with an organic compound having at least one —OR group, wherein R is selected from the group consisting of hydrogen and $C_1$–$C_8$ substituted and unsubstituted alkyl groups.

23. The method of claim 22, wherein said organic compound has the formula

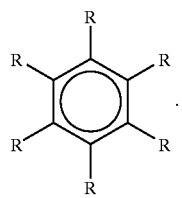

wherein each R is individually selected from the group consisting of —H and —OR$^1$, where R$^1$ is selected from the group consisting of hydrogen and $C_1$–$C_8$ substituted and unsubstituted alkyl groups.

24. The method of claim 22, wherein said organic compound comprises at least one —OH group.

25. The method of claim 22, wherein said organic compound is a hydrocarbon having at least two —OH groups.

26. The method of claim 22, wherein said organic compound is a hydrocarbon having at least one —OH group and at least one ether group bound thereto, wherein the oxygen atom of said ether group is less than about 4 carbon atoms away from the oxygen atom of said —OH group.

27. The method of claim 22, wherein said organic compound is selected from the group consisting of hydroquinone, resorcinol, methoxyethanol, methoxyphenols, glycerol, and mixtures thereof.

28. The method of claim 21, wherein said drying step is carried out at a temperature of from about 250–300° C. and at a pressure of from about 4,000–15,000 kPa.

29. The method of claim 21, wherein the composite resulting from said drying step comprises metal oxide nanoparticles selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, CuO, $Al_2O_3$, $SiO_2$, ZnO, and $Ag_2O$ nanoparticles, and mixtures of the foregoing.

30. The method of claim 21, said composite resulting from said drying step having an average crystallite size of from about 3–60 nm.

31. The method of claim 21, said composite resulting from said drying step having a multi-point surface area of from about 30–700 m$^2$/g.

32. The method of claim 21, further including the step of forming said nanoparticles into a self-sustaining body.

33. The method of claim 21, wherein said layer is at least about 90% by weight carbon, based upon the total weight of the layer taken as 100% by weight.

34. The method of claim 21, wherein said composite comprises from about 50–98% by weight metal oxide nanoparticles, based upon the total weight of the composite taken as 100% by weight.

35. The method of claim 21, wherein said composite comprises from about 2–50% by weight of said layer, based upon the total weight of the composite taken as 100% by weight.

36. The method of claim 21, wherein said nanoparticles of said composite have a surface area, and at least about 10% of said surface area is covered with said layer.

37. The method of claim 21, said layer having a thickness of less than about 10 Å.

* * * * *